UNITED STATES PATENT OFFICE.

HORATIO A. HOLMES, OF EAST CAMBRIDGE, ASSIGNOR TO HOLMES, BERRY & CO., OF HYANNIS, MASSACHUSETTS.

IMPROVEMENT IN LIQUID STOVE-POLISH.

Specification forming part of Letters Patent No. 133,534, dated December 3, 1872.

*To all whom it may concern:*

Be it known that I, HORATIO A. HOLMES, of East Cambridge, in the county of Middlesex and State of Massachusetts, have invented a new and useful or Improved Liquid Stove-Polish; and do hereby declare the ingredients thereof, and the mode of compounding and using the same, to be fully described in the following specification.

The ingredients composing the said polish are plumbago, lamp-black, spirits of turpentine, copal varnish, and sour beer, or equivalent acid.

The proportions of the ingredients for making five gallons of the compound or polish are five pounds of plumbago, (preferring that known in commerce by the name of "silver lead;") three-fourths of a pound of powdered and sifted lamp-black; one quart of spirits of turpentine; one pint of copal or coach-varnish; and three gallons, or thereabout, of sour beer or equivalent acid. In compounding or mixing the same I first put the plumbago and lamp-black into a tank or vessel; next add the spirits of turpentine, and reduce the whole, by stirring, to one homogeneous pasty mass; next add the varnish and thoroughly incorporate the whole; and, finally, add the sour beer or equivalent acid, and stir until the whole has become perfectly intermingled, when the same is ready for use and may be put up in bottles of any desirable size.

Before using the polish the bottle is to be well shaken. The polish may be applied with a sponge or brush to the stove or article to be polished, the gloss being imparted by means of a dry stiff brush in the ordinary manner.

I claim—

The above-described compound, composed of the ingredients and in the proportions substantially as and for the purpose stated.

HORATIO A. HOLMES.

Witnesses:
   F. P. HALE,
   F. C. HALE.